Patented Aug. 24, 1943

2,327,938

UNITED STATES PATENT OFFICE 2,327,938

PRODUCTION OF PHENOLS AND OLEFINS

Donald R. Stevens, Swissvale, and Joseph B. McKinley, Pittsburgh, Pa., assignor to Gulf Research & Development Company, Pittsburgh, Pa., a corporation of Delaware No Drawing. Application March 19, 1940, Serial No. 324,884

7 Claims. (Cl. 260—621)

This invention relates to the production of phenols and olefins; and it comprises a method of producing phenols and olefins from alkylated phenols carrying three or more carbon atoms in the side chain wherein said alkylated phenols are dealkylated by heating in the presence of a molecular compound of aluminum chloride thereby splitting off the alkyl side chain from the phenolic nucleus with formation of mono-olefins with little or no polymerization; all as more fully hereinafter set forth and as claimed.

Various alkylated phenols are technically available from which it is desirable to produce simpler phenols and an olefin group without any fargoing polymerization or molecular change. In particular, such alkylated phenols are an intermediate product in methods of separating isomeric phenols, such as cresols, with not much difference in boiling point. By alkylating one or both phenols, reaction mixtures are produced with which separation by fractional distillation becomes ready. Afterwards it is generally desirable to dealkylate and recover the original phenol or phenols.

Under the present invention from such alkylated starting materials it is possible to produce substantially pure phenols and olefins, particularly branched-chain olefins, such as iso-butylene and iso-amylene. Good yields are obtained both of the phenol and of the olefin.

For the present purposes it is desirable to use a catalyst which while aiding in the splitting off of the side chain, does not catalyze or promote the formation of undesirable polymers and oxidation products. Necessarily, the catalyst must be stable and should not itself break up into undesirable compounds during the process. Nor should it react with the products of dealkylation. Such a catalyst is afforded by a molecular compound of aluminum chloride.

Dealkylation of alkylated phenols has heretofore been effected by heating in the presence of dealkylating catalysts such as sulfuric acid and aluminum chloride. However, these catalysts have been found objectionable in that they have considerable tendency to polymerize the olefins formed and to cause objectionable side reactions unless the conditions of temperature and pressure are maintained at relatively low levels. When the reaction conditions are thus restricted, the reaction does not proceed as fast as is often desirable and the yields of the desired products may be relatively low. Thus, with the catalysts heretofore used in such dealkylation processes efficient operation is often impossible.

We have found that the molecular compounds of aluminum chloride are effective dealkylation catalysts and do not have the stated disadvantages. These compounds which are formed by the addition of one or more molecules of aluminum chloride to various organic molecules, are comparatively stable and exhibit little tendency to cause formation of polymers or oxidation products. When they are used as catalysts, the dealkylation reaction can be carried out rapidly and completely and high yields of pure products are obtained. Also, they exhibit little tendency to break up during the reaction.

Thus, by subjecting alkylated phenols containing branched-chain alkyl substituents having at least three carbon atoms to the action of these molecular compounds of aluminum chloride with organic compounds at temperatures from 80° to 300° C., we have been able to effect dealkylation of the alkylated phenols with the production of substantially pure iso-olefin in good yield and without excessive polymerization of the iso-olefin so produced. We have obtained particularly good results in producing olefins containing from 3 to 6 carbon atoms by this method.

Suitable molecular compounds of aluminum chloride for the purpose of our invention are the addition products of aluminum chloride with compounds such as hydrocarbons, phenols, alcohols, organic acids and acid anhydrides, esters, organic halides, and the like. For example, the product obtained by mixing aluminum chloride and cresol at 0° C. has given good results, as have the molecular compounds of aluminum chloride with di-isobutylene and n-propyl acetate. These compounds, when used according to the method of our invention, will cause a splitting off of the relatively high alkyl groups, but will not decompose cresols, xylenols or ethyl phenols.

These organic molecular compounds of aluminum chloride are advantageously used in amounts equivalent in moles of aluminum chloride to about 0.1 to 1.0 per cent by weight, based on the weight of alkylated phenol. However, because of their high efficiency satisfactory results may be obtained with amounts as low as the equivalent of 0.05 per cent aluminum chloride, and because they have much less tendency to cause polymerization or undesirable oxidation-reduction side reactions than do sulfuric acid and aluminum chloride, they can be used in higher concentration; the equivalent of 2.0 per cent or more of aluminum chloride.

In order to effect satisfactory dealkylation with these dealkylating catalysts an elevated temperature is usually required. While some dealkylation is effected at temperatures as low as 80° C., temperatures of at least about 150° C. are usually required to carry out the reaction in a reasonable length of time. Temperatures which approach the boiling point of the dealkylated phenol are particularly advantageous in batch operation and in continuous operation higher temperatures may be used. In general, however, excessively high temperatures, above about 300° C., should be avoided because of the tendency to contamination of the liberated iso-olefin with HCl. Too low temperatures are also undesirable because we have found that a decrease in temperature causes a decrease in dealkylating action.

It is usually advantageous to conduct the dealkylation at atmospheric pressure, although superatmospheric pressures and sub-atmospheric pressures may be used in some instances. Working at atmospheric pressure, however, renders condensation or recovery of the evolved olefin less difficult and is of especial advantage where continuous operation is attempted. However, working under some pressure is also advantageous in that the size of the equipment may be reduced and refrigeration is not required to liquefy and separate the evolved iso-olefin. For example, forty-five pounds pressure will liquefy iso-butylene at room temperature. High pressures are to be avoided, as they may cause some reversal of the reaction. When it is desired to flash off the phenol formed during the reaction, reduced pressure may be used, but recovery of the iso-butylene product then becomes more difficult.

The dealkylation operation can advantageously be conducted by heating the alkylated phenol with or without the use of reflux in the presence of a small amount of the dealkylating catalyst. Evolution of the olefin usually begins at about 80° to 100° C. and increases as the temperature rises. Heating is usually continued until the evolution of olefin ceases or until the boiling point of the residue indicates that dealkylation has proceeded to the desired point. Ordinarily, this will be the point of complete or substantially complete dealkylation of the alkylated phenol, but in special instances partial dealkylation may be effected. For example, a di-butylated cresol may be reduced to a mono-butylated cresol whenever it is desired to obtain the latter product.

It will be understood that in using the term "dealkylation" we are referring to a splitting off of relatively high alkyl groups, that is to say, alkyl substituents containing three or more carbon atoms, such as isopropyl and tertiary butyl groups. Dealkylation in the contemplated manner does not split off such methyl or ethyl groups as are present. Thus it will not reduce a cresol to phenol ($C_6H_5OH$).

We have obtained good yields of iso-olefines by the use of aluminum chloride-cresol, aluminum chloride-di-iso-butylene, and aluminum cshloride-n-propyl-acetate in amounts corresponding to between 0.05 and 2.0 per cent by weight of aluminum chloride based on the weight of the alkylated phenol being treated. Particular good results are obtainable using amounts corresponding to about 1.0 per cent of aluminum chloride. In the following specific examples, the results obtainable with each of these dealkylating catalysts are illustrated:

EXAMPLE I 9.821 g. of 2,6-di-tertiary-butyl-4-methyl phenol, just sufficient to give off 2000 cc. of iso-butylene gas at standard temperature and pressure on complete debutylation was placed in a reaction vessel. The vessel was surrounded by a nitro-benzene vapor bath which maintained the temperature at about 208° C. or just above the refluxing temperature of para-cresol, the phenolic end product of the dealkylation. When the 2,6-di-tertiary-butyl-4-methyl phenol had been brought to temperature a small vial containing a molecular compound of aluminum chloride and meta-cresol in amount equivalent to 1.0 per cent aluminum chloride was introduced into the reaction chamber, the entrance port was closed immediately and a timer was started. The iso-butylene evolved was collected in a large bottle immersed in a water bath thermostatically controlled and held at 27° C. The bottle had been filled with water at the start of the run and with the aid of a manometer, the water was siphoned out of the bottle at the same rate at which the iso-butylene was collected. The water was withdrawn into a measuring cylinder and the gas was collected at atmospheric pressure. At the end of 3000 seconds 98.1 per cent of the iso-butylene had been collected.

EXAMPLE II

The same procedure was followed as in Example I, with the exception that the catalyst used was aluminum chloride di-iso-butylene. At the end of 3000 seconds, 98 per cent of the iso-butylene had been collected. At the end of 4500 seconds 100 per cent of the iso-butylene had been collected.

EXAMPLE III

In this example the same procedure as that used in Example I was followed with the exception that aluminum chloride n-propyl acetate was used as a catalyst. At the end of 3000 seconds 94.5 per cent of iso-butylene had been collected. At the end of 4500 seconds 99 per cent of iso-butylene had been collected.

A comparison of these results is shown in the following table:

TABLE I

Dealkylation of 2,6-di-tertiary-butyl-4-methyl phenol

| Catalyst | Per cent $AlCl_3$ equivalent | Time (seconds) required to collect the following theoretical percentages of iso-butylene | | | | | Percent iso-butylene collected | | |
|---|---|---|---|---|---|---|---|---|---|
| | | 10% | 30% | 50% | 70% | 90% | 1800 sec. | 3000 sec. | 4500 sec. |
| $AlCl_3$-cresol | 1.0 | 30 | 240 | 584 | 1,155 | 2,140 | 84.5 | 98.1 | |
| $AlCl_3$-di-iso-butylene | 1.0 | 30 | 165 | 460 | 1,010 | 2,160 | 85.2 | 98.0 | 100.0 |
| $AlCl_3$-n-propyl acetate | 1.0 | 40 | 195 | 555 | 1,250 | 2,550 | 80.5 | 94.5 | 99.0 |

Although the above examples are limited to batch operation, the process may be used continuously. In a continuous operation we prefer to operate at temperatures higher than 200° C.; we may use temperatures as high as 300° C. and may operate in the vapor phase. Thus, in dealkylating alkylated cresols we advantageously operate at temperatures ranging from 225–230° C.

By using this temperature range we find that the cresol is vaporized and carried away as liberated. This is advantageous, for the cresol does not stay behind to dilute the reaction mixture. The ratio of catalyst to unreacted alkylated phenol remains high, and the rate of gas evolution is materially increased and held more constant during the entire dealkylation period.

While our invention has been set forth and described with reference to various specific operating and exemplary details, it will be understood that our invention is not limited to such details, except by virtue of the claims hereinafter made.

What we claim is:

1. A process of producing olefins and phenols comprising heating an alkyl phenol having at least one branched-chain alkyl substituent in the presence of an organic molecular compound of aluminum chloride in an amount equivalent to 0.1 to 1.0 per cent of aluminum chloride based on the weight of alkyl phenol.

2. A process of producing olefins and phenols comprising heating at a temperature of about 80° to about 300° C. an alkyl phenol having at least one branched-chain alkyl substituent in the presence of an organic molecular compound of aluminum chloride in an amount equivalent to 0.1 to 1.0 per cent of aluminum chloride based on the weight of alkyl phenol.

3. A process of producing olefins and phenols comprising heating at a temperature of about 80° to about 300° C. an alkyl phenol having at least one branched-chain alkyl substituent in the presence of an organic molecular compound of aluminum chloride, in amount equivalent to 0.05 to 2.0 per cent of aluminum chloride based on the weight of alkyl phenol.

4. A process of producing olefins and phenols comprising heating at a temperature of about 80° to about 300° C. an alkyl phenol having at least one branched-chain alkyl substituent in the presence of an addition product of aluminum chloride and a cresol in amount equivalent to 0.05 to 2.0 per cent aluminum chloride based on the weight of alkylated phenol.

5. A process of producing olefins and phenols comprising heating at a temperature of about 80° to about 300° C. an alkyl phenol having at least one branched-chain alkyl substituent in the presence of an addition product of aluminum chloride and di-iso-butylene in amount equivalent to 0.05 to 2.0 per cent aluminum chloride based on the weight of alkylated phenol.

6. A process of producing olefins and phenols comprising heating at a temperature of about 80° to about 300° C. an alkyl phenol having at least one branched-chain alkyl substituent in the presence of an addition product of aluminum chloride and n-propyl acetate in amount equivalent to 0.05 to 2.0 per cent aluminum chloride based on the weight of alkylated phenol.

7. A process of producing olefins and phenols comprising heating an alkyl phenol having at least one branched-chain alkyl substituent in the presence of an organic molecular compound of aluminum chloride in an amount equivalent to 0.05 to 2.0 per cent of aluminum chloride based on the weight of the alkyl phenol, under a pressure sufficient to liquefy the evolved olefin.

DONALD R. STEVENS.
JOSEPH B. McKINLEY.